United States Patent [19]
Dougherty et al.

[11] Patent Number: 5,470,157
[45] Date of Patent: Nov. 28, 1995

[54] BEARING SEAL FOR SENSING ANGULAR VELOCITY

[75] Inventors: John D. Dougherty, Stark; Mark R Moldovan, both of Stark; Dennis L. Otto, Carroll; Orestes J. Varonis, Stark, all of Ohio

[73] Assignee: The Timken Company, Canton, Ohio

[21] Appl. No.: 219,655

[22] Filed: Mar. 29, 1994

[51] Int. Cl.[6] .............................. F16C 19/08; G01P 3/44
[52] U.S. Cl. .................... 384/448; 324/207.25; 384/484
[58] Field of Search .................................. 354/448, 484; 324/207.25; 310/168

[56] References Cited

U.S. PATENT DOCUMENTS

| | | | |
|---|---|---|---|
| 3,500,091 | 3/1970 | Jones | 310/168 |
| 4,732,494 | 3/1988 | Guers et al. | 384/448 |
| 4,795,278 | 1/1989 | Hayashi | 384/448 |
| 4,884,901 | 12/1989 | Harsdorff | 384/448 |
| 4,948,277 | 8/1990 | Alff | 384/448 |
| 4,968,156 | 11/1990 | Hajzler | 384/448 |
| 5,004,358 | 4/1991 | Varvello et al. | 384/446 |
| 5,022,659 | 6/1991 | Otto | 277/1 |
| 5,085,519 | 2/1992 | Dougherty | 384/448 |
| 5,143,458 | 9/1992 | Alff et al. | 384/448 |
| 5,195,830 | 3/1993 | Caillault et al. | 384/448 |
| 5,261,752 | 11/1993 | Ouchi et al. | 384/484 X |

FOREIGN PATENT DOCUMENTS

| | | |
|---|---|---|
| 2558223 | 7/1985 | France . |
| 2207470 | 2/1989 | United Kingdom . |
| 2188153 | 2/1990 | United Kingdom . |
| 2249397 | 5/1992 | United Kingdom . |

Primary Examiner—Thomas R. Hannon
Attorney, Agent, or Firm—Polster, Lieder, Woodruff & Lucchesi

[57] ABSTRACT

A seal for an antifriction bearing having a fixed inner race and a rotating outer race includes inner and outer seal cases which are pressed over cylindrical mounting surfaces on the inner and outer races, respectively. To this end, the seal cases have extended axial walls which actually fit over the mounting surfaces in the bearing races and radial walls, connected to the extended axial walls. The radial walls of the two cases are spaced apart so that an annular chamber exists between the two radial walls. Each seal case has an elastomeric seal element supported by its radial wall remote from its extended axial wall and that seal element establishes a fluid barrier along the other seal case, so that the two seal elements isolate the chamber from the interior of the bearing and from the environment at the exterior of the bearing. The inner case carries a sensor having a head that is located in the annular chamber between the two axial walls. The radial wall of the outer case carries means for exciting the sensor such that it produces a pulsating signal when the outer case rotates relative to the inner case, and the frequency of the signal reflects the angular velocity.

33 Claims, 5 Drawing Sheets

BEARING SEAL FOR SENSING ANGULAR VELOCITY

BACKGROUND OF THE INVENTION

This invention relates in general to bearing seals and more particularly to seals which have the capacity to sense angular velocity.

Antilock brake systems, which are found on many automotive vehicles of current manufacture, require devices at the wheels for sensing the angular velocities of the individual road wheels. On any vehicle so equipped, the speed sensing devices generate signals which are monitored by an electronic processor that in turn controls the braking forces applied to the wheels, the object being to keep all four wheels rotating at the same velocity, even though one of the wheels may be rolling over a surface that offers considerably less frictional resistance than the surface over which the others are rolling. Some automobiles also have traction control systems that minimize slip at the drive wheels and thereby maximize the tractive effect. These systems rely on speed sensing devices as well, and indeed when a vehicle is equipped with both an antilock braking system and a traction control system, the speed sensing devices at the drive wheels may serve both systems.

The typical speed sensing device includes an encoder ring which rotates with the wheel to which the device is assigned and a sensor which monitors the encoder ring in the sense that it produces a pulsating electrical signal the frequency of which reflects the angular velocity of the ring. To this end, the ring, which is formed from a ferrous metal, has discontinuities in the form of teeth or apertures that disrupt a magnetic flux upon rotation of the ring. The sensor responds to the periodic disruptions and delivers a signal, the frequency of which is proportional to the angular velocity of the ring and vehicle wheel. In order for the sensor to operate effectively, the head of the sensor must be quite close to the rotating ring.

While the typical sensing device is located in the region of the bearing for the wheel that it monitors, it still lies outside the sealed environment of the bearing which is often supplied as a package. As such, the sensing device is exposed to water and much worse corrosive road chemicals. It is also exposed to grit and to stone impingement.

To be sure, others have placed encoder rings within the sealed environments of bearing packages. Indeed, where the inner races of the bearings rotate, as holds true at the front wheels for most front wheel drive automobiles, the bearing assemblies will accommodate speed sensing devices. Sometimes enough space exists between the two rows of rolling elements in such a package to accept an encoder ring which rotates with the inner races, while the outer races or housing in which the outer races fit accommodates the sensor. The sensor head, the encoder ring, and the gap which lies between them all exist within an environment isolated by seals which protect the raceways and rolling elements of the bearing. U.S. Pat. No. 5,085,519 shows such an arrangement.

But when the outer races of the bearing assemblies rotate around stationary inner races, as holds true for some designs used at the nondriven front wheels of rear wheel drive automobiles, the bearing assemblies do not easily accept a sensing device. The problem resides in mounting the sensor and accommodating its electrical leads. Relatively little space exists in the sealed environment for the somewhat bulky sensor, and the spindle must undergo additional machining to provide bores for the leads. For this reason, in most bearing assemblies which have both rotating outer races and sensing devices, the sensors are located outside of the bearing assemblies. In this regard, see U.S. Pat. Nos. 4,884,901 and 4,795,278. While others have attempted to incorporate the sensing devices into the seals, the arrangements are cumbersome and diminish the effectiveness of the seals. Moreover, the sensors are arranged such that they are not easily removed and replaced.

The present invention resides in a seal which contains a speed sensing device, with the encoder ring and the head of the speed sensing device being located in a region isolated from the surrounding environment by the seal. Moreover, the seal has excellent sealing characteristics and accommodates the sensing device such that the sensing device does not significantly enlarge the bearing assembly or render it unacceptable for traditional bearing mountings. The seal comes preassembled, and is designed for use in preassembled bearing packages where the air gap between the encoder ring and the sensor head of the seal are preset. Yet in several embodiments the sensor may be removed quite easily from the seal, should it require replacement.

DESCRIPTION OF THE DRAWINGS

In the accompanying drawings which form part of the specification and wherein like numerals and letters refer to like parts wherever they occur.

DETAILED DESCRIPTION

Referring now to the drawings, A (FIG. 1) designates an antifriction bearing which couples a road wheel B of an automotive vehicle to a spindle C that is attached to and projects from the suspension system of the vehicle, all to enable the road wheel B to rotate about an axis X of rotation which is of course the axis of the spindle C. The bearing A is fitted with seals D and E at its inboard and outboard ends, respectively, to isolate its interior from the surrounding environment. The inboard seal D further produces a signal which reflects the angular velocity of the wheel B—indeed, a wheel speed input signal for enabling the effective operation of an antilock braking system or a traction control system.

The bearing A includes (FIG. 1) an outer race in the form of a double cup 2, an inner race in the form of two cones 4 and 6, and rolling elements in the form of tapered rollers 8 arranged in two circular rows between the cup 2 and the two cones 4 and 6. At its outboard .end the cup 2 has an outwardly directed flange 10 to which the wheel B is bolted. At its inboard end, it has a machined cylindrical surface 12 which faces outwardly and an annular groove 13 which opens out of the surface 12 near its end. The cup 2 also has two raceways 14 which taper downwardly from its ends to its midportion. The two cones 4 and 6 lie essentially within the cup 2 and fit over the spindle C, to which they are clamped such that they cannot shift axially. Each cone 4 and 6 has an outwardly presented raceway 16 that is tapered and a thrust rib 18 which projects radially outwardly beyond the large end of the raceway 16. The thrust rib 18 has a cylindrical surface 20 which runs out to the end of its cone 4 or 6, that is, to the so-called cone back face against which the clamping force is applied. The two cones 4 and 6 abut at their opposite ends, that is, at their front faces, and when so arranged, their raceways 16 lie within and face the raceways 14 of the cup 2. The cone raceways 16 likewise taper downwardly toward the midportion of the bearing A where the two cones 4 and 6 abut. The rollers 8 lie in circular rows between the opposed raceways 14 and 16 of the cup 2 and the cones 4 and 6, with their tapered side faces contacting the raceways 14 and 16. The large end faces of the rollers 8 bear against the thrust ribs 18 for the cones 4 and 6, and indeed, the ribs 18 prevent the rollers 8 from being expelled from the annular space between the cup raceways 14 and the cone raceways 16, that is from the interior of the bearing A.

Figure 1:
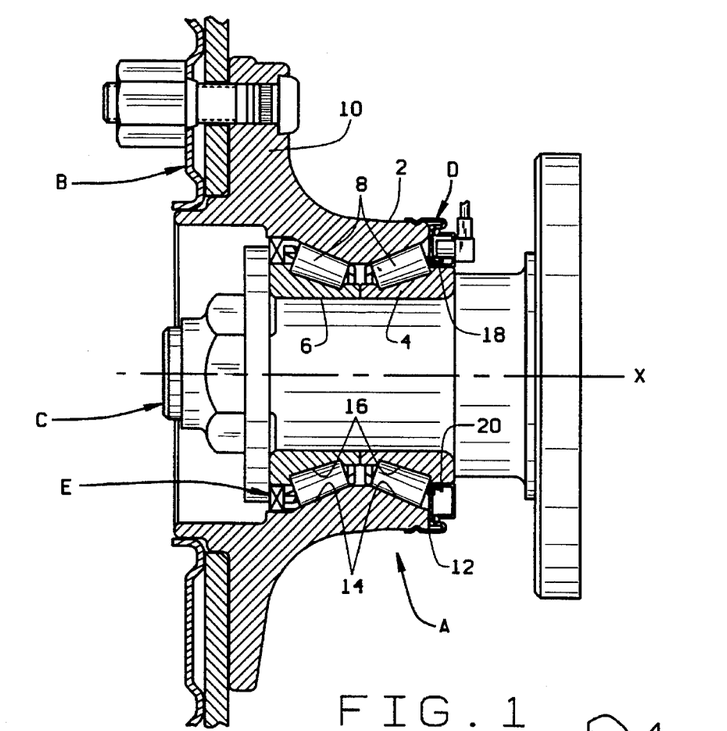
FIG. 1 is a sectional view in elevation of a bearing assembly fitted with a seal constructed in accordance with and embodying the present invention, the bearing assembly being installed over a spindle.

The seal D fits around the cup 2 and the thrust rib 18 of the inboard cone to close one end of the annular space between the cup and cone raceways 14 and 16. The seal E fits into the outboard end of the cup 2 and around the thrust rib 18 of the outboard cone 6, closing the other end of the annular space that exists between the raceways 14 and 16. Thus, the seals D and E isolate the annular interior of the bearings A from the surrounding environment.

Figure 2:
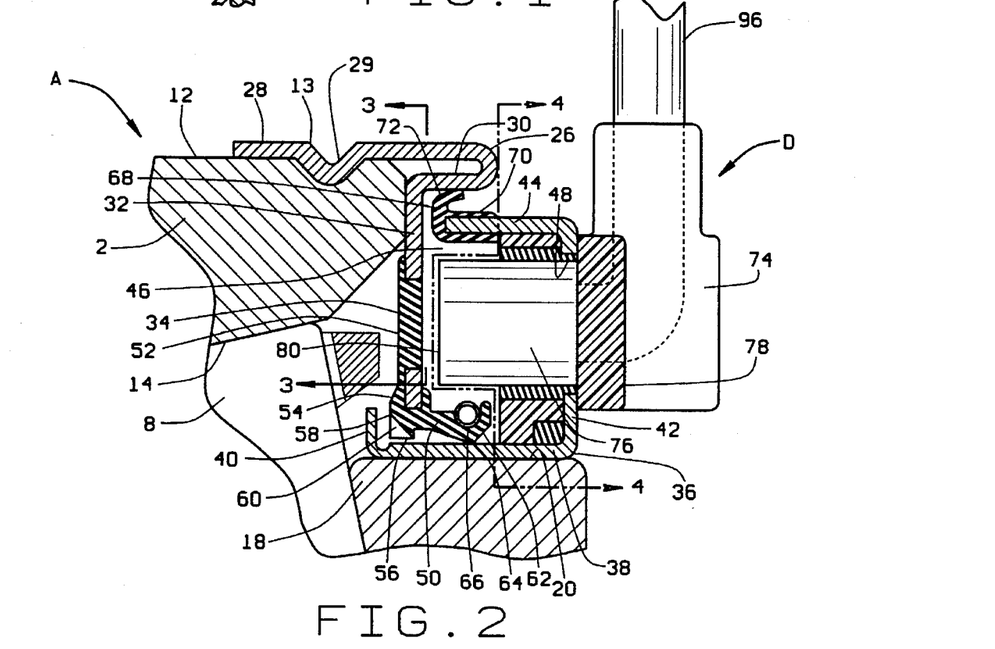
FIG. 2 is an enlarged sectional view of the seal fitted to the bearing assembly.
Figure 3:
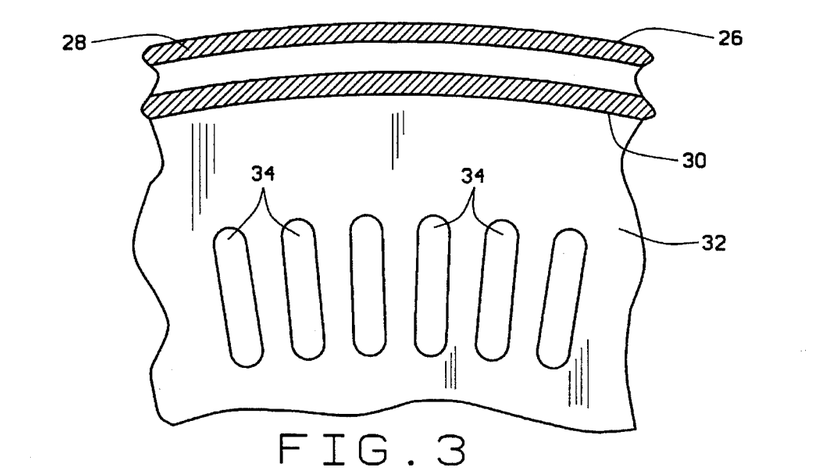
FIG. 3 is a fragmentary sectional view of the seal taken along line 3—3 of FIG. 2 and showing the apertures in the outer case.

The inboard seal D includes (FIG. 2) an outer seal case 26 formed from steel as a stamping. It has an extended axial wall 28 which fits over the cylindrical surface 12 at the inboard end of the cup 2, there being an interference fit between the wall 28 and surface 12. The surface 12 thus provides a mounting for the outer case 26, and the case 26 establishes a static fluid barrier at the surface 12. Initially, the axial wall 28 forms a continuous cylinder, but once the wall 28 is fitted over the surface 12, a short section of the wall 28 is rolled inwardly into the groove 13 of the cup 2, to produce an annular locking segment 29 which mechanically unites the outer case 26 and cup 2. The axial wall 28 projects beyond the end of the cup 2, and at a bend merges into a short axial wall 30 which extends back toward the end face of the cup 2. The short axial wall 30 lies within the extended wall 28 and at its opposite end merges into a radial wall 32 which extends radially inwardly toward the thrust rib 18 of the inboard cone 4, terminating at an inner margin located slightly outwardly from the cylindrical surface 20 on the rib 18. The portion of the radial wall 32 that lies nearest to the short axial wall 28 abuts the end face of the cup 2, thereby locating the outer case 26 axially with respect to the cup 2. The remaining portion of the radial wall 32, which lies inwardly from the end face of the cup 2, contains elongated apertures 34 arranged in a circular row at equal circumferential intervals, with their major axes directed radially, that is to say radially with respect to axis X to which the circular row is concentric (FIG. 3). The apertures 34 form discontinuities in the wall 32.

The seal D also has an inner case 36 (FIG. 2) that includes an extended axial wall 38 which fits over the cylindrical surface 20 on the thrust rib 18 for the inboard cone 4. As such, it lies immediately inwardly from the radial wall 32 of the outer case 26. An interference fit exists between the axial wall 38 and the cylindrical surface 20 of the rib 18, so the cylindrical surface 20 provides a mounting for the inner case 36 and establishes a static fluid barrier along it. At its end closest to inboard row of rollers 8, the wall 38 turns outwardly in the form of a slight radial lip 40 that serves to unitize the seal D. At its opposite end the axial wall 38 merges into a radial wall 42 which projects outwardly from the thrust rib 18, generally flush with the back face of the cone 4. But the radial wall 42 terminates short of the axial walls 28 and 30 on the outer case 26, and indeed merges into a short axial wall 44 which is directed toward the radial wall 32 of the outer case 26. The axial wall 44 lies partially within the short axial wall 30 of the outer case 26, but its free end is spaced from the radial wall 32 of the outer case 26.

Figure 4:
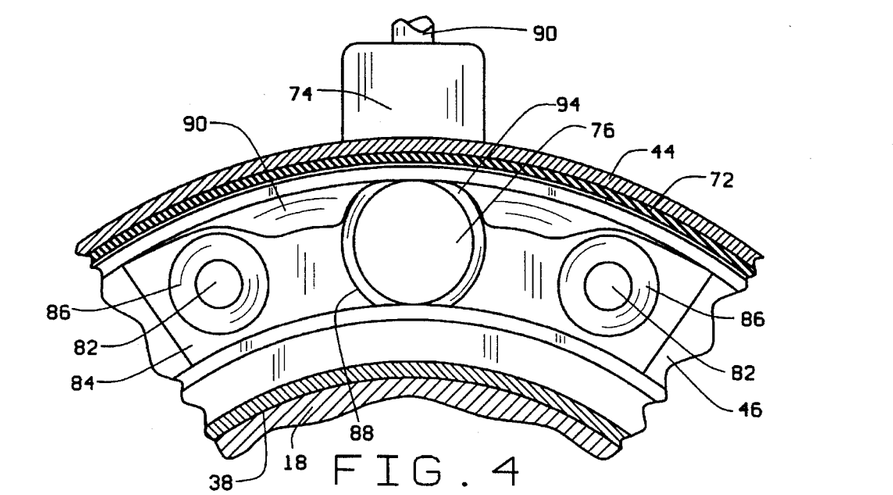
FIG. 4 is a sectional view taken along line 4—4 of FIG. 2 and showing head of the sensor and the retainer through which it fits.

The two cases 26 and 36 are configured and positioned such that their respective radial walls 32 and 42 are spaced from each other, and these walls coupled with the axial walls 30, 38 and 44 of the two cases 26 and 36 enclose an annular chamber 46. The radial wall 42 of the inner case 36 has a circular opening 48 (FIG. 4) which opens into the chamber 46.

In addition to the two cases 26 and 36, the seal D has an inner seal element 50 (FIG. 2} which is formed from an elastomer and thus possesses a measure of flexibility. The inner seal element 50 is bonded to the radial wall 32 of the outer case 26, with the region of bonding taking the form of a flat annular segment 52 which extends outwardly beyond the row of apertures 34, so that the elastomer completely fills the apertures 34 and renders the wall 32 impervious. At the inner margin of the radial wall 32 the inner seal element 50 flares axially, taking the form of a pumping labyrinth 54 having a cylindrical surface 56 which lies around, but is spaced slightly away from the extended axial wall 38 of the inner case 36. The labyrinth 54 also has a front face 58 which is presented toward the lip 40 on the inner case 36. The labyrinth 54 contains pumping cavities 60 which open out of the cylindrical surface 56 and the front face 58, interrupting the edge at which those surfaces intersect. The side surfaces of the cavities 60 lie oblique to the direction of relative movement between the pumping labyrinth 54 and the extended axial wall 38 on the inner case 36 so as to direct any lubricant that enters the cavities 60 back toward the lip 40 and the interior of the bearing A. The seal element 50 also includes a contact lip 62 which projects generally axially away from the labyrinth 54 toward the radial wall 42 of the inner case 36, yet considerable space remains between the end of the lip 62 and the radial wall 42. The lip 62 has converging surfaces which meet at an edge where the lip 62 contacts the extended axial wall 38 of the inner case 36. Indeed, immediately behind the edge 64, the lip 62 has a groove which contains a garter spring 66 that urges the lip 62 toward the axial wall 38 to ensure that the edge 64 remains in contact with the wall 38. Thus, the pumping labyrinth 54 and contact lip 62 establish fluid barriers along the extended wall 38 of the inner case 36.

Another fluid barrier exists between the short axial wall 30 of the outer case 26 and the short axial wall 44 of the inner case 36, it being established by an elastomeric outer seal element 68 (FIG. 2) which is carried by the axial wall 44. The seal element 68 includes a base 70, which is bonded to the inside and outside faces of the wall 44 as well as along its end edge, and a lip 72 which projects from the base 70, first radially toward the short axial wall 30 of the outer case 26 and then obliquely away from the radial wall 32 of the inner case 26. The obliquely directed portion of the lip 70 contacts the short axial wall 44 of the outer case 26. Being formed from an elastomer, the lip 70 possesses a measure of flexibility.

Apart from closing the annular space between the cup 2 and the inboard cone 4, the seal D carries a sensor 74 (FIGS. 2 & 4) which reacts to the rotation of the outer seal case 26 with the cup 2 and wheel B, specifically to the disruption in a magnetic flux—a disruption which results from the apertures 34 in the radial wall 32 of the inner case 26 moving past the sensor 74. Discontinuities other than apertures may also serve to stimulate the sensor 74. For example, circumferentially spaced ridges or alternating pole—no pole or alternating north—south poles on the radial wall 32 will create the necessary disruptions in the flux. Several varieties of sensing devices have the capacity to sense discontinuities, whether those discontinuities be apertures or ridges or alternating magnetic poles, and the sensor 74 may operate on the principle utilized by any of those types. Irrespective of the principle of operation, the sensor 74 has a head 76 which projects from a flange 78 and contains a ferromagnetic core which terminates at an end face 80. When the head 76 contains only a single core, it is preferably cylindrical in configuration, but when it has two cores, it preferably takes on an elongated configuration. The head 74 projects through the opening 48 and into the sealed chamber 46 where the end face 80 of its core is presented toward the radial wall 32 of the outer case 26—indeed, toward the ring of apertures 34 in the wall 32. Yet a small air gap exists between the face 78 and the radial wall 32. The flange 78 fits snugly against the radial wall 32 or a gasket or seal may be interposed between it and the wall 42.

The sensor 74 is secured to the inner case 36 by two machine bolts 82 (FIG. 5) which pass through the flange 78 of the sensor 74, through the radial wall 42 of the case 36, and into an arcuate retainer 84 (FIG. 6) that is located within the chamber 46. Actually, the bolts 82 thread into inserts 86 that are embedded within the retainer 84, and between the two inserts 86, the retainer 84 has a cylindrical hole 88 which aligns with the opening 48 in the case 36 and receives the head 76 of the sensor 74. Preferably the inserts 86 are made from metal, and the remainder of the retainer 84 is molded from a polymer.

Figure 5:
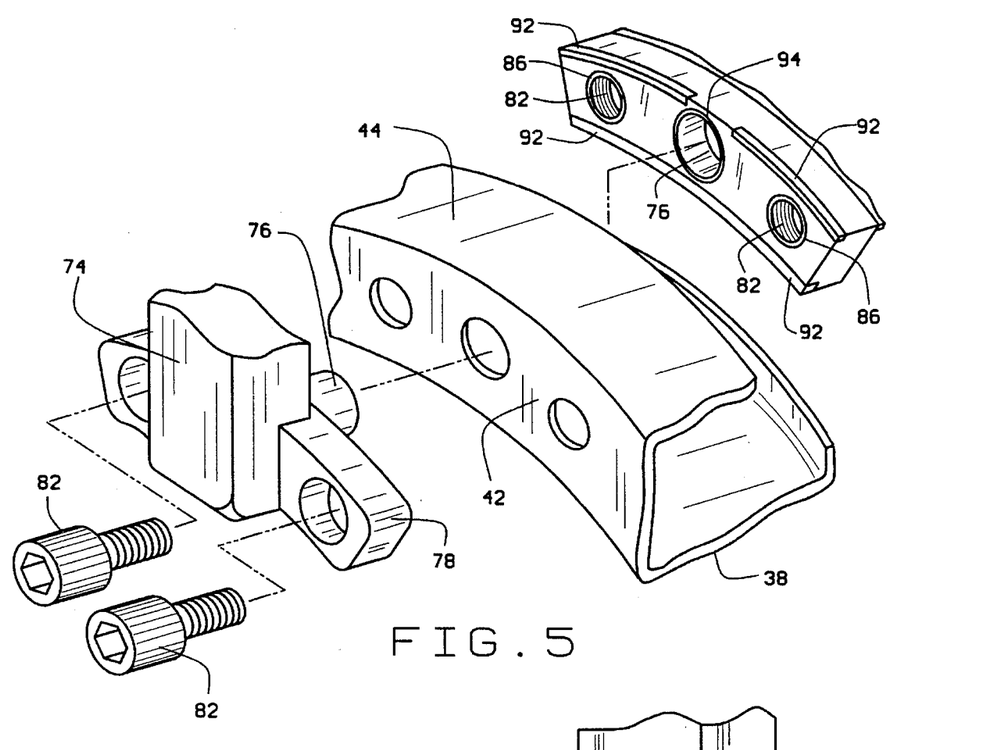
FIG. 5 is an exploded perspective view showing the sensor and the retainer to which it is fastened to hold it on the inner case.
Figure 6:
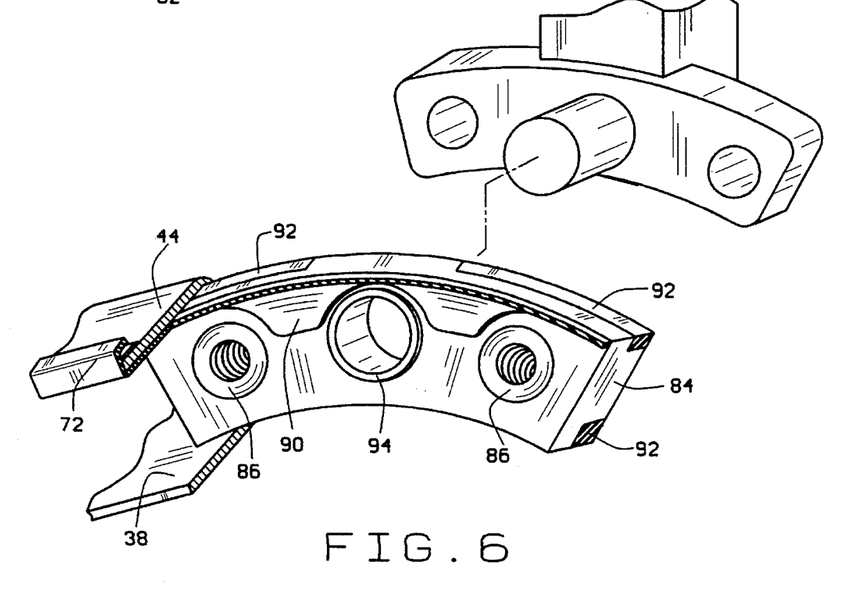
FIG. 6 is an exploded perspective view showing the sensor, a segment of the inner case, and the retainer.

The retainer 84 does not lie loosely in the chamber 46. On the contrary, its radial dimension is essentially that of the spacing between the two axial walls 38 and 44 of the inner case 36, so the sensor 74 fits snugly between those walls. Thus, the axial walls 38 and 44 resist torque applied to the bolts 82. Furthermore, the retainer 84 is actually bonded to the inner case 36 with the elastomer from which the outer seal element 68 is formed. To this end, the base 70 of the outer seal element 68 extends along the inside face of the axial wall 44 for the inner case 36 and is bonded to the exposed face of the retainer 84, forming pads 90 on each side of the hole 88. More of the elastomer exists in bands 92 formed along the edges at the opposite face, indeed within rabbets along those edges. And while all of the bands 92 are bonded to the retainer 84, the outer bands 92 are bonded to the short axial wall 44 and radial wall 42 of the inner case 36, whereas the inner band 92 is bonded to the extended axial wall 38 and radial wall 42 of the case 36. Still more of the elastomer is bonded to the surface of the hole 88 where it forms a gasket 94 having an inner diameter slightly less than the diameter of the head 76 for the sensor 74. Actually, the gasket 94 extends axially beyond the cylindrical hole 88 in the retainer 84 and also lines the opening 48 in the radial wall 42 of the inner seal case 36, it being bonded to the radial wall 42 as well. The head 76 of the sensor 74 fits snugly into the gasket 94 which effects a fluid-tight seal between the head 76 and the retainer 84 and inner case 36.

Finally, the sensor 74 beyond its flange 78 has an electrical cable 96 extended from it. Through the cable 96 signals reflecting the angular velocity of the outer case 26 pass to an electronic processor.

To install the sensor 74 on the inner case 36, one simply aligns its head 76 with the gasket 94 that lines the opening 48 in the case 36 and the cylindrical hole 88 in the retainer 84 and urges the head 76 through the gasket 94 until the flange 78 comes against the radial wall 42. The bolts 82 are fitted through the flange 78 on the sensor 74 and threaded into the metal inserts 86 in the retainer 84. The sensor 74 is removed from the seal case 36 as easily as it is installed. The ease of installation and removal facilitate replacement of the sensor 74 after the bearing is placed in service, all without any further disassembly of the bearing A.

The seals D and E come with the bearing A which they serve to unitize, thus enabling the bearing A to be sold as a preassembled package. To install the seal D, which itself is unitized by its lip 40, on the bearing A, the extended axial wall 28 of the outer case 26 is pressed over the cylindrical surface 12 of the cup 2, while the extended axial wall 38 of the inner case 36 is concurrently pressed over the cylindrical surface 20 on the thrust rib 18 of the inboard case 4. The advancement of the outer case 26 over the cup 2 ends when its radial wall 32 abuts the end of the cup 2. The inner case 36 is advanced over cone thrust rib 18 to a position which will provide a proper gap between the end face 80 of the sensor 74 and the radial wall 32 of the outer case 26. The sensor 74 may be on the inner case 36, when it is pressed over the thrust rib 18 or it may be installed afterwards. In any event, once the outer and inner cases 26 and 36 reach the proper positions on the cup 2 and cone 4, the axial wall 28 of the outer case 26 is rolled inwardly opposite the groove 13 in the cup 2 to create the annular locking segment 29 which unites the outer case 26 with the cup 2.

In operation, the outer case 26 and its seal element 50 rotate with cup 2 which is attached to the road wheel B. The inner case 36 and its seal element 68, on the other hand, remain fixed in position on the inboard cone 4 which in turn is on the spindle C, it being clamped firmly on the spindle C with the outboard cone 6. The spindle C, of course, is fixed in the sense that it does not rotate about the axis X. The head 76 of the sensor 74 produces a magnetic flux which passes through the radial wall 32 of the outer case 26 in the region of the apertures 34 in that wall. Being nonuniform in the region of its apertures 34, the ferrous radial wall 32 disrupts the magnetic flux as the wall 32 rotates, and the sensor 74 delivers, through the leads of the cable 96, a pulsating or sinusoidal signal, the frequency of which is proportional to the angular velocity of the outer case 26. Actually, the radial segments between the apertures 34 in the rotating radial wall 32 cause changes in the magnetic flux, and the sensor 74 detects these changes, producing a pulsating signal. Other forms of discontinuities may be used to excite the sensor 74 as well. For example alternating ridges and valleys will serve that purpose as will alternating magnetic poles.

Since the air gap is located within the chamber 46, it is isolated from the surrounding environment which at times can be quite severe. As such, the head 76 of the sensor 74 does not see a continuous spray of moisture during inclement weather, nor is it subject to attack from road chemicals used to thaw ice. Moreover, sand and grit cannot lodge in the air gap and perhaps damage the sensor 74 or the encoder ring formed by the radial wall 32 of the inner seal case.

Should the sensor 74 fail to function properly, it is easily removed and replaced, since only the two bolts 82 hold it in place, and they are easily withdrawn.

Despite the presence of the sensor 74, the seal D remains quite compact—and the same holds true with regard to the packaged bearing A. The seal D, with its pumping labyrinth 54 and contact lip 62 on the inner seal element 50 and its lip 72 on the outer seal element 68, provides highly effective barriers which prevent lubricant from leaving the interior of the bearing A and contaminants from entering.

A modified seal F (FIG. 7) is very similar to the seal D, particularly insofar as its outer case 26, inner case 36 and seal elements 50 and 68 are concerned. However, the outer case 26, at the end of its extended axial wall 28 has an outwardly directed ring 100 which facilitates stripping the case 26 from the cylindrical surface 12 over which its axial wall 28 fits. On the other hand, the extended wall 38 of the inner case 36, beyond the inner seal element 50 contains an offset 102 which positions that portion of the axial wall 38 away from the cylindrical surface 20 of the cone thrust rib 18. The radial wall 42 of the inner case 36 contains a similar offset 104, and indeed the extended axial wall 38 and the radial wall 42 merge at their respective offsets 102 and 104. Here the two walls 38 and 42 have an elastomeric drive element 106 bonded to them. When unrestrained the drive element 106 projects radially inwardly, slightly past the inner surface of the remainder of the axial wall 38, and here it presents an undulating surface. Indeed, as the inner case 36 is advanced over the thrust rib 18, the drive element 106 is compressed between the offset 102 in the wall 38 and the cylindrical surface 20 of the rib 18. As such the drive element 106 increases the friction between the inner seal case 36 and the cone rib 18, thereby further assuring that the case 36 will not rotate on the rib 18.

Figure 7:
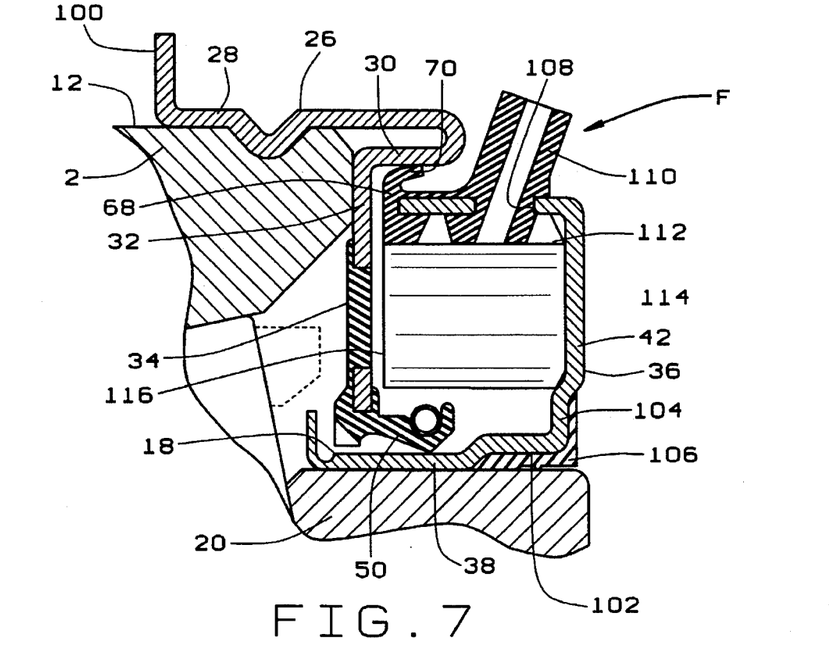
FIG. 7 is an enlarged sectional view of a modified seal containing a sensor.

Apart from that, the radial wall 42 is solid throughout, and as such is completely devoid of openings. The short axial wall 44, however, in the region beyond the bend that represents the merger of the two axial walls 28 and 30 in the outer case 26 contains an aperture 108. The outer seal element 68 at the free end of the short axial wall 44 on the inner case 36 is molded integral with a grommet 110 that occupies the aperture 108 and with a carrier 112 that encapsulates a sensor 114 having an end face 116 that is presented toward the radial wall 32 of the outer case 26—indeed, toward the ring of apertures 34 in that case. The outer seal element 68, the grommet 110, and the carrier 112 are all united into a single elastomeric molding which is bonded to both the inside and outside faces of the short axial wall 30 and to the inside face of the radial wall 42.

Another modified seal G (FIGS. 8 & 9) also closely resembles the seal D. However, the radial wall 32 of its outer case 26 contains no apertures 34 and thus does not constitute an encoder ring. Instead, it carries an encoder ring 120 which projects axially from the radial wall 32 into the annular chamber 46 so as to lie close to the short axial wall 44 of the inner case 36. The ring 120 has teeth 122 (FIG. 9) which project axially, giving a serrated configuration to the ring 120.

Figure 8:
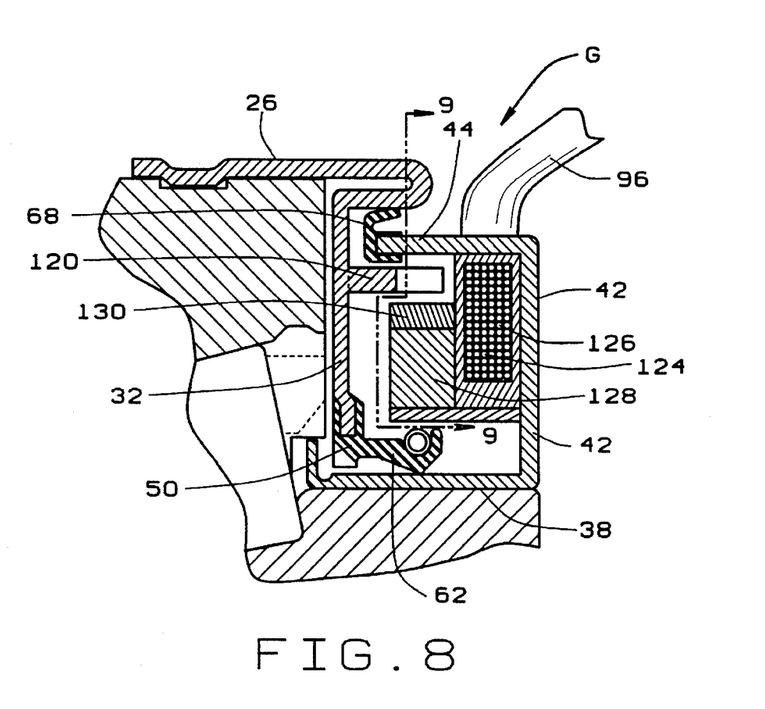
FIG. 8 is a sectional view of still another modified seal containing a sensor.
Figure 9:
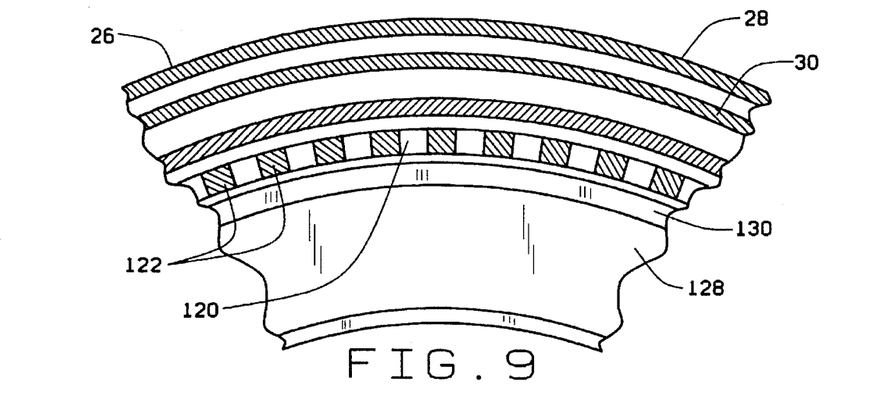
FIG. 9 is a sectional view taken along line 9—9 of FIG. 8.

The inner case 36, on the other hand, carries an annular sensor 124 which is likewise located in the annular chamber 46. It includes a coil 126 which lies along the radial wall 42 of the inner case 36, its windings extending circumferentially, and a ferrous block 128 that encircles the contact lip 62 of the inner seal element 50 and lies within encoder ring 120. The block 128 carries an annular magnet 130 which has alternating north and south poles and is presented toward the teeth 122 of the ring 120, there being an air gap between the two. The coil 126 has leads which are contained within a cable 96 that passes through the inner case 36 at its short axial wall 44.

When the cup 2 and outer seal case 26 rotate, the encoder ring 120 revolves around the magnet 130 and the teeth 122 disrupt the magnetic field produced by the magnet 130. The disruption is such that it induces an alternating current voltage across the leads of the coil 126 and that voltage has a frequency which is proportional to the angular velocity of the cup 2 and thus provides an accurate reflection of that angular velocity.

In the seal G, the size of the air gap does not depend on the relative axial positions of the two seal cases 26 and 36, so the case 36 for the seal G may be positioned with less precision than the corresponding seal cases 36 on the seals D and F.

Still another modified seal H (FIGS. 10 & 11) fits a slightly modified bearing assembly I. The seal H also resembles the seal D. However, the extended axial wall 28 of its outer case 26 merges directly into the radial wall 32, there being no axial projection of the extended wall 28 with a return in the form of a short axial wall 30. The extended axial wall 28 at its opposite end has an outwardly directed ring 100 to facilitate stripping the outer case 26 for the cup 2.

Figure 10:
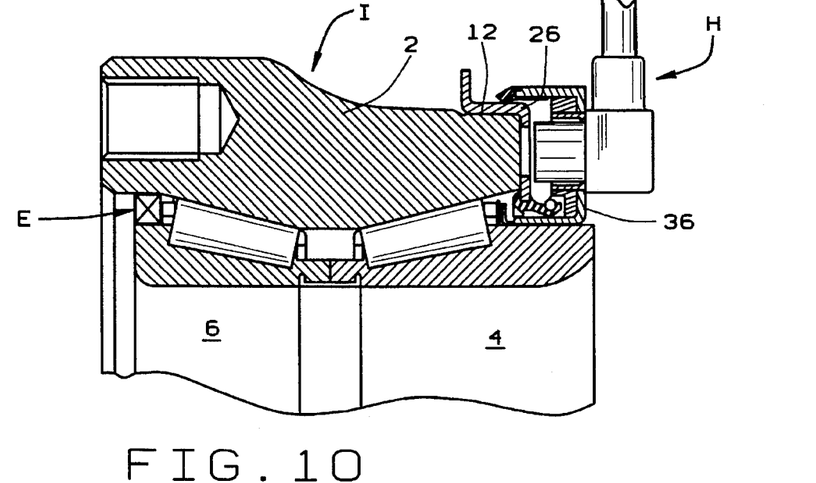
FIG. 10 is a fragmentary sectional view of another bearing assembly fitted with yet another modified seal containing a sensor.
Figure 11:
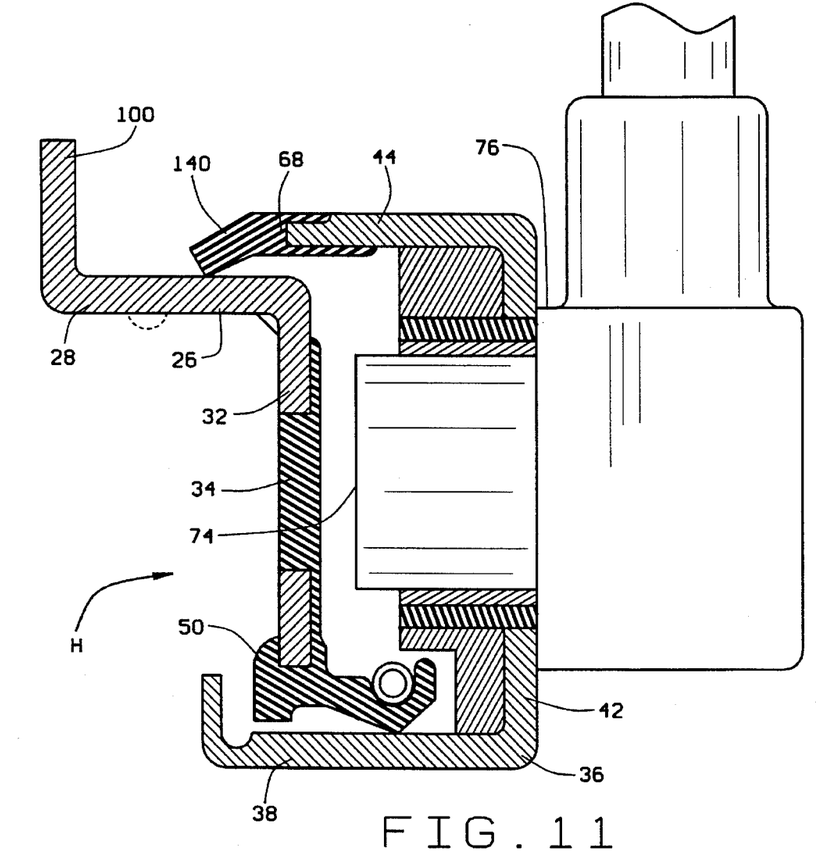
FIG. 11 is an enlarged sectional view of the modified seal depicted in FIG. 10.

The inner case 36, on the other hand, has its radial wall 42 extended outwardly beyond the extended axial wall 28 of the outer case 26 so that its short axial wall 44 has a diameter greater than the extended axial wall 28 of the outer case 26. The outer seal element 68, while being bonded to the free end of the short axial wall 44, takes on a slightly altered configuration. It has a lip 140 which projects obliquely inwardly toward the extended axial wall 28 of the outer case 26 and contacts that wall along its outwardly presented surface.

This invention is intended to cover all changes and modifications of the example of the invention herein chosen for purposes of the disclosure which do not constitute departures from the spirit and scope of the invention.

What is claimed is:

1. In combination with an antifriction bearing which has an outer race that rotates around the bearing axis, an inner race that remains fixed with respect to the axis, and rolling elements arranged in a circular row between the outer and inner races, with each race having at one of its ends a mounting surface that is presented outwardly away from the axis, an improved seal for isolating the space between the two races from the environment at the exterior of the bearing, said seal comprising: an outer case fitted to the outer race at the mounting surface thereof and having a generally radially directed wall; an inner case fitted to the inner race on the mounting surface thereof and having a generally radially directed wall that is spaced from the radially directed wall of the outer case so that a chamber exists between the radial walls of the two cases; a first seal element carried by the outer case and establishing a first fluid barrier with the inner case, with the first barrier isolating the chamber from the interior of the bearing; a second seal element carried by the inner case and establishing a second fluid barrier with the outer case with the second barrier isolating the chamber from the environment at the exterior of the bearing; a sensor mounted on the inner seal case and having a head located in the chamber; the sensor being capable of producing a pulsating signal when excited; and means on the generally radial wall of the outer case for exciting the sensor when the outer race rotates, so that the sensor produces a signal, the frequency of which reflects the angular velocity.

2. The combination according to claim 1 wherein the inner case has an axial wall located along the mounting surface of the inner race, and the first seal element establishes the first barrier along the axial wall.

3. The combination according to claim 2 wherein the outer case has an axial wall and the second seal element establishes the second barrier along the axial wall of the outer case.

4. The combination according to claim 3 wherein each of the seal elements is formed from an elastomer.

5. The combination according to claim 4 wherein the first and second seal elements contact the axial walls of the inner and outer seal cases, respectively.

6. The combination according to claim 4 wherein the means for exciting the sensor constitutes circumferentially spaced discontinuities on the generally radial wall of the outer seal case, with the discontinuities passing by the head of the sensor as the outer case rotates with the outer race.

7. The combination according to claim 6 wherein the discontinuities are formed by circumferentially spaced apertures in the radial wall of the outer case, and the elastomer of the first seal element fills the apertures.

8. The combination according to claim 1 wherein the mounting surfaces on the outer and inner races are cylindrical; wherein the outer and inner cases have extended axial walls to which their radial walls are connected, and the extended axial walls fit snugly on the mounting surfaces such that interference fits exist between the extended axial walls and the mounting surfaces.

9. The combination according to claim 8 wherein the outer case has a shorter axial wall interposed between one end of its extended axial wall and its radial wall so that the short axial wall lies within and is surrounded by the extended axial wall and serves to connect the extended axial wall with the radial wall; and wherein the second seal element contacts the short axial wall of the outer case and establishes the second barrier along that wall.

10. The combination according to claim 9 wherein the inner case has an extended axial wall which fits over the mounting surface of the inner race and a short axial wall located within the short axial wall of the outer case, with the radial wall of the inner case serving to connect the two axial walls of that case; and wherein the second seal element is carried by the short axial wall of the inner case and the first seal element is carried by the radial wall of the outer case and establishes the first barrier along the extended axial wall of the inner case.

11. The combination according to claim 8 wherein the seal element of the inner case encircles the extended axial wall of the outer case and establishes its barrier along that wall.

12. The combination according to claim 1 wherein the radial wall of the inner case contains an aperture and the head of the sensor fits through the aperature, it being small enough to be withdrawn axially through the aperture as well; and further comprising means for securing the sensor to the inner case such that it can be detached and removed from the inner case.

13. The combination according to claim 12 wherein the means for securing comprises screws which extend through the sensor and pass into the case where they are engaged.

14. A fluid seal located around an axis of rotation and comprising: a rigid outer case having a first axial wall and a radial wall connected to the axial wall, with the radial wall being directed inwardly toward the axis from the axial wall; a rigid inner case having a first axial wall which is located within the axial and radial walls of the outer case, and a radial wall which is connected to and extends outwardly from the first axial wall, with the radial wall of the inner case being spaced from the radial wall of the outer case so that an annular chamber exists between the two radial walls, the inner case also having a second axial wall which is connected to the radial wall of that case; a first flexible seal element connected to the radial wall of the outer case and establishing a fluid barrier along the first axial wall of the inner case; a second flexible seal element connected to the second axial wall of the inner case and establishing a fluid barrier along the axial wall of the outer case; a sensor carried by the inner case and having a head located within the chamber, the sensor being capable, when excited, of generating a signal having a frequency; and means on the radial wall of the outer case for exciting the sensor when the outer case rotates relatively to the inner case about the axis, with the frequency of the signal reflecting the angular velocity.

15. A fluid seal according to claim 14 wherein the means for exciting the sensor comprises circumferentially spaced apertures arranged in a circular row such that they pass the head of the sensor as the outer case rotates relative to the inner case; and wherein the first flexible seal element fills the apertures.

16. A fluid seal according to claim 14 wherein the means for exciting the sensor comprises circumferentially spaced teeth arranged in a circular row.

17. A fluid seal according to claim 16 wherein the teeth extend axially and the circular row of ribs encircles the sensor.

18. A fluid seal according to claim 14 wherein the second axial wall of the inner case lies within the axial wall of the outer case.

19. A fluid seal according to claim 18 wherein the outer case includes a second axial wall which lies parallel to and surrounds the first axial wall, and the first axial wall is interposed between and connected to the radial wall and the second axial wall of the outer case.

20. A fluid seal according to claim 14 wherein the second axial wall of the inner case lies farther from the axis than the axial wall of the outer case and the second flexible seal element contacts the outwardly presented surface on the axial wall of the outer case.

21. A fluid seal according to claim 14 wherein the radial wall of the inner case contains an opening and the head of the sensor fits through the opening such that it can be withdrawn from the chamber and opening to separate the sensor from the inner case; and further comprising means for securing the sensor to the inner case.

22. A fluid seal located around an axis of rotation and comprising: a rigid outer case having a first axial wall and a radial wall connected to the axial wall, with the radial wall being directed inwardly toward the axis from the axial wall; an inner case which is rigid and has a first axial wall, which is located within the axial and radial walls of the outer case, and a radial wall, which is connected to and extends outwardly from the first axial wall, with the radial wall of the inner case being spaced from the radial wall of the outer case so that a chamber exists between the two radial walls, the inner case also having a second axial wall which is connected to the radial wall of that case and is located radially outwardly from the first axial wall of the outer case; a first flexible seal element connected to the radial wall of the outer case and establishing a fluid barrier along the first axial wall of the inner case; a second flexible seal element connected to the second axial wall of the inner case and establishing a fluid barrier along the axial wall of the outer case; a sensor carried by the inner case and having a head located within the chamber, the sensor being capable, when excited, of generating a signal having a frequency; and means on the radial wall of the outer case for exciting the sensor when the outer case rotates relative to the inner case about the axis, with the frequency of the signal reflecting the angular velocity.

23. A seal for closing the end of an annular space between an outer member which rotates around an inner member about an axis of rotation, said seal comprising: an outer case configured to fit on the outer member and having an axial wall and a radial wall, the axial wall providing a sealing surface, the radial wall having discontinuities arranged circumferentially around the axis; an inner case configured to fit along the inner member and having an axial wall and a radial wall, the axial wall of the inner case providing a sealing surface and the radial wall of the inner case being presented opposite the radial wall of the outer case such that an annular chamber exists between the two radial walls; a first seal element mounted on the inner case and establishing a dynamic fluid barrier along the sealing surface of the outer case; a second seal element carried by the outer case and establishing a dynamic fluid barrier along the sealing surface of the inner case, all such that the seal elements isolate the chamber, and a sensor carried by the inner case and projecting through the radial wall thereof and into the chamber such that it can be easily removed from the inner case, the sensor being presented toward the radial wall of the outer case such that the discontinuities pass by the sensor when the outer case rotates, the sensor having the capacity to detect the movement of the discontinuities past it and to produce an electrical signal which reflects the angular velocity.

24. A seal according to claim 23 wherein a retainer is located within the chamber against the radial wall of the inner case; wherein the sensor includes a flange which lies against the radial wall of the inner case at the surface thereof that is presented away from the chamber and also a head which projects from the flange through the radial wall of the inner case and through the retainer and has its end presented toward the radial wall of the outer case; and wherein fasteners extend through the flange of the sensor and into the retainer to secure the inner case.

25. A seal according to claim 23 wherein the sensor includes a flange which lies against the radial wall of the inner case at the surface thereof that is presented away from the chamber and also a head which projects from the flange through the radial wall of the inner case and has its end presented toward the radial wall of the outer case; and wherein fasteners extend through the flange of the sensor and secure the sensor to the inner case.

26. A seal for closing the end of an annular space between an outer member and an inner member, one of which rotates relative to the other about an axis of rotation, said seal comprising: a sealing surface carried by the member which rotates; a case configured to fit on the member which does not rotate and having integral axially and radially directed walls of substantially the same thickness; a flexible seal element on the case and establishing a dynamic fluid barrier along the sealing surface; a sensor secured to and carried by the case and being capable of detecting the movement of discontinuities around the axis and producing a signal that reflects the angular velocity of those discontinuities, the sensor having a head which projects through one of the walls of the case but is substantially longer than the walls are thick so that the head projects beyond that one wall, the head being retractable from the case; and fasteners releasably attaching the sensor to the case so that it can be removed from the case and replaced.

27. A seal according to claim 26 and further comprising: a retainer located along the case, and wherein the fasteners extend through the case and into the retainer which they engage.

28. A seal according to claim 27 wherein the sensor also has a flange which projects outwardly from the head and lies along the seal case, and the fasteners extend through the flange and into the retainer.

29. A seal according to claim 27 wherein the seal element is formed from an elastomer which further is bonded to the retainer and the case to hold the retainer along the case in the absence of the fasteners.

30. A seal according to claim 29 wherein the case has axially directed walls which are spread apart and a radial wall connecting the axial walls, the seal element being attached to one of the axial walls, and the retainer fitting between the axial walls and against the radial wall.

31. A seal according to claim 30 wherein the retainer contains a hole through which the head of the sensor projects and the hole is lined with an elastomer which embraces the head of the sensor to provide a fluid barrier.

32. A seal according to claim 31 and further comprising: another case having a radial wall and an axial wall, the radial wall having the discontinuities on it and the axial wall having the sealing surface.

33. A seal according to claim 26 wherein the sensor has a flange from which the head projects and the flange lies along said one wall of the case, and wherein the fasteners extend through the flange and through said one wall of the case.

* * * * *